United States Patent
Wentzel

[11] 3,792,616
[45] Feb. 19, 1974

[54] RECIPROCATING DRIVE

[75] Inventor: Milford N. Wentzel, Rye, N.Y.

[73] Assignee: Norco, Inc., Ridgefield, Conn.

[22] Filed: Feb. 7, 1973

[21] Appl. No.: 330,280

[52] U.S. Cl. ................................ 74/57, 308/174
[51] Int. Cl. ............................................ F16h 25/12
[58] Field of Search .. 74/57, 58, 89.15, 25; 308/174

[56] References Cited
UNITED STATES PATENTS

| | | | |
|---|---|---|---|
| 1,387,855 | 8/1921 | Lippitt | 74/57 |
| 1,866,529 | 7/1932 | Farkas | 74/57 |
| 2,798,396 | 7/1957 | Lee | 308/174 |
| 3,668,940 | 6/1972 | Avena et al. | 74/57 |
| 656,310 | 8/1900 | Warburton | 308/174 |

Primary Examiner—Charles J. Myhre
Assistant Examiner—Wesley S. Ratliff, Jr.
Attorney, Agent, or Firm—H. Gibner Lehmann; Lehmann K. Gibner

[57] ABSTRACT

A reciprocating drive mechanism comprising an elongate shaft and a collar which fits around the shaft and is slidable lengthwise thereof. The shaft has one or more grooves cut into it, each groove constituting a closed loop. If multiple loops are provided on the shaft they are all identical to and arranged in conformity with each other. The collar has one or more roller pins projecting into its bore and adapted to be accommodated respectively in the grooves of the shaft. The roller pins are carried by means of anti-friction bearings which enable them to turn easily and with the least amount of friction. The shaft grooves preferably have divergent walls, and the rollers have conical tips adapted to engage and ride along the walls in the manner of a roller following a track. Additionally, the rollers are spring biased inwardly to insure proper loading contact of each roller with a wall of its respective groove. At its two ends, the collar carries annular needle bearing assemblages which ride on the shaft and centralize the latter in the collar as well as providing a low friction bearing for the shaft. Any continued relative movement between the shaft and collar is characterized by a reciprocation of the latter with respect to the shaft.

7 Claims, 4 Drawing Figures

PATENTED FEB 19 1974 3,792,616
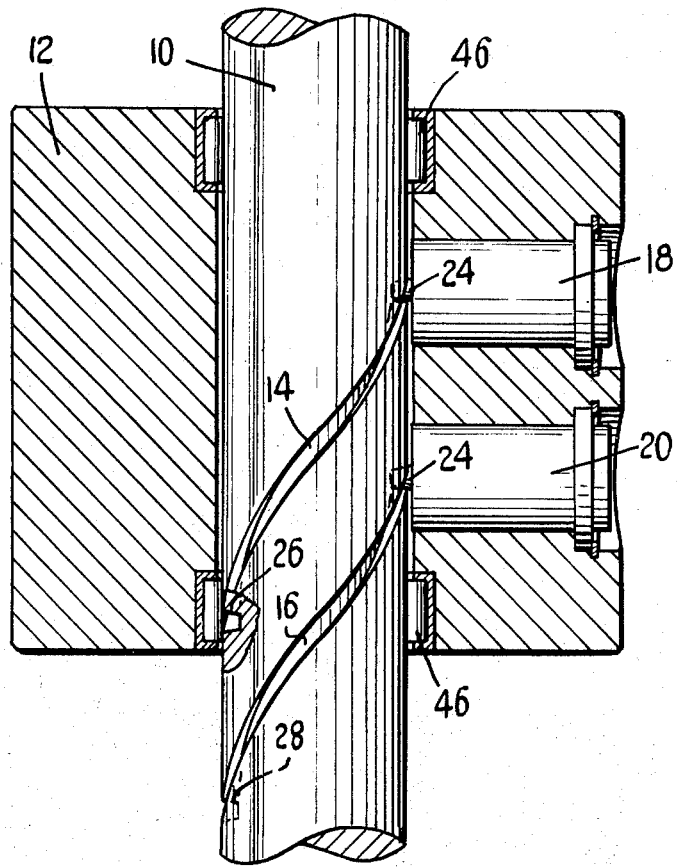
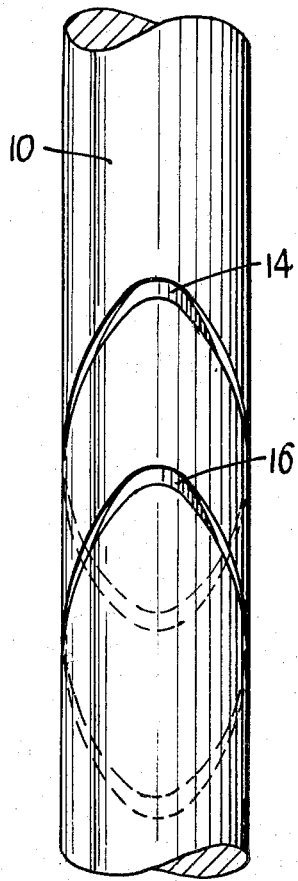
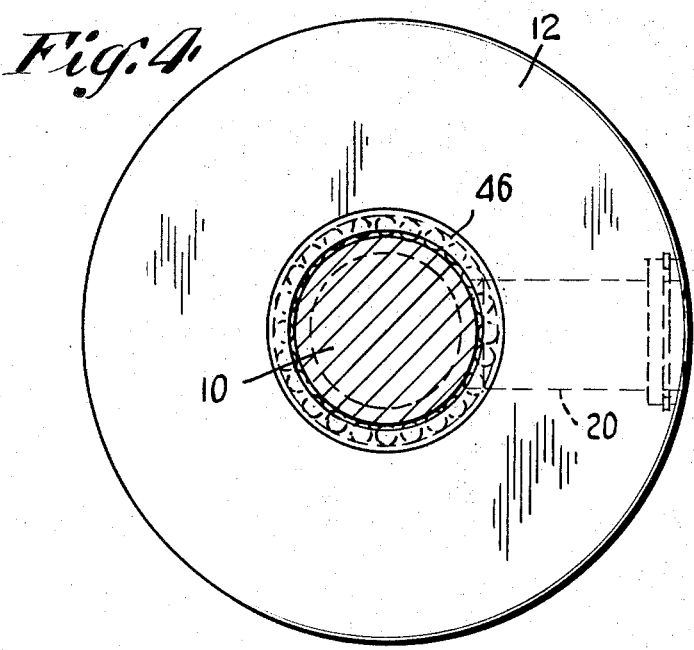
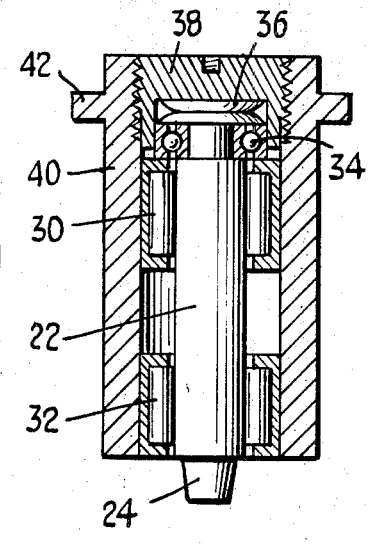

RECIPROCATING DRIVE

CROSS REFERENCES TO RELATED APPLICATIONS

1. Patent application in the name of Joseph R. Metz, Ser. No. 189,218 filed Oct. 14, 1971 and entitled "Reciprocating Type Pump". 2. Patent application in the name of Berger A. LaBarre, Ser. No. 261,603 filed June 12, 1972 and entitled "Reversing Nut for a Diamond Thread Screw".

3. Patent application in the name of John C. Kennedy, Ser. No. 268,058 filed June 30, 1972 and entitled "Variable Efficiency Mechanical Transmission".

4. Patent application in the name of Joseph R. Metz, Ser. No. 283,162 filed Aug. 23, 1972 and entitled "Radial Roller Anti-Friction Transmission With Eccentric Bushings".

BACKGROUND

This invention relates to reciprocating drive mechanisms, particularly those involving a turntable shaft and a nut or collar which extends around and is slidable along the shaft.

Heretofore various types of reciprocating devices of the above nature have been proposed and produced, one of the simplest consisting merely of a threaded rod on which there is carried a nut having the usual screw threads. As the rod is turned first in one direction and then in the other, the nut is caused to shift back and forth along the rod or reciprocate, the extent of travel depending on the extent of turning of the rod or shaft. Other later arrangements involved shafts having a multiple thread constituting a greater lead or pitch, with the nut or collar being provided with various types of lugs or shoes arranged to follow in the grooves provided by the thread formation of the shaft.

In some instances, the thread formation had reverse portions by which it constituted what is commonly referred to as a "diamond" type thread or lead. In still later developments, the projections or lugs carried by the nut or collar were constituted as rollers, being supported in the collar body by both radial and thrust type anti-friction bearings. The walls of the grooves in the shaft were then preferably made divergent, and the nose portions of the rollers were conical whereby suitable inward spring biasing of the rollers would cause all of these to assume their proper share of the load (in the case where multiple rollers were utilized).

In the case of diamond threads there was always the drawback that the follower lugs or rollers of the nut clicked or jumped in traversing an intersection between two grooves of the shaft. If intersecting grooves were not employed to effect the reciprocation and instead the shaft was given reverse turning movements, this involved additional equipment in the nature of reversing devices, increasing the cost and complexity of the mechanism. And the early, simple nut and screw arrangement had the serious drawback of very low efficiency and high friction. Thus, with all of these prior devices there were limitations, either as to the smoothness of operation or else the load carrying capacity, or the avoidance of complexity of construction. No one prior device, so far as I am able to ascertain, has been able to avoid and overcome all of the foregoing drawbacks. Where some disadvantages were avoided, others still existed so that the need for a simple, efficient and effective reciprocating drive has never previously been fully, satisfactorily met.

SUMMARY

The above disadvantages and drawbacks of prior reciprocating drive devices are obviated by the present invention, which has for its main object the provision of a novel and improved shaft and nut or collar combination to effect a reciprocating movement, wherein there is had a large load capacity with virtually friction-free operation, this being accomplished by an especially simple and fool-proof structure which may be easily fabricated at low cost. A related object of the invention is to provide an improved reciprocating drive mechanism as above characterized, which has an especially long useful life and wherein the members which are most subject to wear are easily and quickly replaceable, greatly facilitating the maintenance and reducing upkeep.

A feature of the invention resides in the provision of an improved reciprocating drive in accordance with the foregoing, wherein additional load capacity can be initially built into the mechanism without a great deal of added cost or without greatly increasing the size of the components.

Still other features and advantageous will hereinafter appear.

In the accompanying drawings, illustrating one embodiment of the invention:

FIG. 1 is a fragmentary axial sectional view of a reciprocating drive mechanism as provided by the invention, comprising a grooved shaft and a roller-carrying nut or collar with cooperable radial-type end bearing centralizers.

FIG. 2 is an axial sectional view similar to that of FIG. 1, but taken at 90° to the plane of the section of FIG. 1.

FIG. 3 is an enlarged axial sectional view of one spring-biased roller assembly of the type employed in the nut or collar of FIGS. 1 and 2.

FIG. 4 is an end elevational view of the reciprocating drive mechanism.

As shown, the drive mechanism of the invention comprises essentially a shaft 10 and a nut or collar 12 which surrounds the shaft and is turnable thereon and slideable therealong. In the illustrated embodiment of the invention, the shaft 10 is provided with two identical tracks or grooves 14, 16 displaced one upstream of the other. Each of the grooves 14, 16 constitutes a closed loop, and functions in some respects like a thread element on the shaft with the exception that it is continuous whereas the conventional thread element has a beginning portion and an end portion located at axially spaced locations on the shaft. Further, as provided by the present invention, the collar 12 has a pair of roller assemblages designated generally by the numerals 18, 20, these assemblages being identical to each other and one such assemblage being illustrated in FIG. 3. Each of the roller assemblages comprises a roller pin or body 22 having a nose portion 24 which is preferably conical so as to closely fit either of divergent walls 26 or 28 of the grooves 14, 16.

While in the illustrated embodiment of the invention the grooves 14, 16 are described as having divergent walls, it will be understood that they can equally well be formed to have parallel side walls, in which circumstance the nose portion 24 of the roller pin 22 will be essentially cylindrical instead of conical.

The grooves 14, 16 of the shaft 10 are precisely oriented with respect to each other whereby the highest portions thereof and also the lowest portions are exactly in alignment respectively. That is, the positions of the grooves 14, 16 are symmetrically arranged and in relative conformity, being seen as located to nest rather than to be at variance. The pitch distance or spacing between the grooves measured lengthwise of the shaft 10 is constant, and such pitch distance equals exactly the distance between the center lines of the roller assemblages 18, 20.

In order to compensate for slight differences or tolerances in the manufacture of the components, and also to reduce shock forces under conditions of direction reversal and high acceleration, the roller pins 22 are spring-biased inwardly, whereby each always fully contacts the associated wall of its respective groove and assumes its proper share of the load to which the drive is subjected. Each roller, due to such spring biasing, is saved from excessive, destructive forces not only while the collar 12 is travelling in one given direction but also at those places where it reverses direction. Excessive wear on the shaft 10 is also prevented.

Each of the roller pins 22 is carried in the collar 12 by means of a pair of radial needle-bearing assemblages 30, 32. In addition, the roller pins 22 at their outer ends engage thrust bearing assemblage 34 which in turn engage spring washers 36 carried in a threaded screw cap 38. The needle bearing assemblages 30, 32 are mounted in a bushing 40 which has an annular shoulder 42 by which it is positioned in the collar body 12. The outer end of the bushing 40 is internally threaded to accommodate the screw cap 38, as clearly illustrated in FIG. 3. By such arrangement, each roller pin 22 is seen to be spring-biased inwardly, to force it into intimate engagement with one of the side walls of its respective groove in the shaft 10.

Roller nut assemblages comprising multiple rollers of the type illustrated herein are also illustrated and described in the co-pending application of Joseph R. Metz, Ser. No. 283,162 identified above; and in the co-pending application of John C. Kennedy, Ser. No. 268,058, the copending application of Berger LaBarre, Ser. No. 261,603 and the co-pending application of Joseph R. Metz, Ser. No. 189,218, all also identified above. The various roller nut constructions of these co-pending applications, with or without suitable modification, can be utilized for the purposes of the present invention, as will be readily understood when the constructions of the co-pending applications are analyzed.

From the foregoing it will be seen that, due to the co-action between the roller pins 22 of the collar 12 and the grooves 14, 28 of the shaft 10 as relative movement between these parts is caused to occur either by turning of the shaft, turning of the collar, or axial movement of one or the other part, there is established a predetermined relative reciprocation between the parts. By virtue of the anti-friction mounting of the pins 22 and the rolling nature of these by which a rolling contact is established with the side walls of the grooves 14, 16 there is largely eliminated all significant sliding friction during such reciprocation.

It will be observed that the force on the collar 12 as occasioned by engagement of the roller pins 22 with the grooves 14, 16 of the shaft 10 is one-sided; that is, all of the loading is experienced by one side portion of the collar 12. In accordance with the present invention such one-sided loading is successfully counteracted in a manner to result in an effective and practical, commercially feasible drive mechanism, by providing a pair of radial needle bearing assemblages 46 in the end portions of the nut 12. Such needle bearing assemblages have small, cylindrical roller type elements, as is readily understood, and by the present invention such roller type elements are arranged to have a rolling engagement with the exterior surface of the shaft 10 and to adequately counteract the side loading of the collar 12.

Even where the needle bearing assemblages 46 are caused to traverse one or the other of the grooves 14, 16 there is no likelihood of failure or unsmooth operation by virtue of the fact that each needle bearing assemblage 46 has a complete 360° contact capability around the periphery of the shaft 10. Also, the individual cylindrical roller elements are made sufficiently long to maximize contact with the shaft as they pass over the grooves. While the overall contact area is not as large or continuous as in the case of cylindrical sleeve bearings, there is instead a decided advantage in the rolling nature of the engagement with the surface of the shaft. As the collar 12 is caused to shift longitudinally or lengthwise of the shaft, the result or effect of the slippage of the needle bearings on the shaft surface is greatly minimized due to the turning of such bearings as the shaft turns.

I have found that by virtue of this turning nature of the needle bearings the effect of slippage between the latter and the shaft is reduced to a point where it is practically negligible. As a consequence there results a commercially practical and feasible reciprocating drive device of long, useful life, contrary to what might be expected. Because the loading on the bushing 12 is one sided, and since there is no true rolling action at all times between the needle bearing assemblages 46 and the shaft 10, the presence of slippage at these bearing assemblages might be thought to defeat the workability of the drive, particularly where high loading occurs. Contrarywise, however, it has been found that the combination comprising the roller pins 22 which load only one side of the collar 12, in conjunction with the two end centralizer bearings 46 constituting needle rolling elements, provides a surprisingly satisfactory performance in terms of high efficiency, low sliding frictional forces, and long useful life.

If only light loads are to be handled, the shaft 10 can be provided with but a single groove 14 and the collar 12 can have a single roller assemblage 18. If especially heavy loads are encountered, the shaft 10 can have a plurality of the grooves 14, 16, with a corresponding number of rollers, as many as are considered necessary to adequately carry the load which is contemplated.

It will now be understood from the foregoing that I have provided a novel and improved, especially simple low-friction reciprocating drive mechanism wherein relatively few components are involved, and wherein a smooth and uninterrupted reciprocating movement is had. Automatic compensation for heavy reversing forces, and for manufacturing tolerances is accomplished by virtue of the spring loading of the roller pins, in conjunction with the conical nose formation thereof and the divergent side walls of the grooves in the shaft. Standard assemblages can be utilized, such as the needle bearing assemblages 46, 30 and the thrust assemblages 34 and spring washers 36. Parts which are susceptible to wear, consisting essentially of the bearing assemblages, can be readily replaced after a period of use; this is also true of the spring washers. Such construction greatly extends the life of the drive mechanism. The mechanism can function either by turning the shaft 10 in one direction, or turning the collar 12 in one direction, or else by shifting either the shaft 10 or the collar 12 axially with respect to each other.

Variations and modifications are possible without departing from the spirit of the invention:

I claim:

1. A reciprocating drive mechanism comprising, in combination:
   a. an elongate shaft having an endless groove in its surface, said groove constituting an endless loop arranged with portions extending transversely of the shaft,
   b. a collar encircling, and movable lengthwise of the shaft,
   c. a roller element carried by the collar and extending inwardly of the bore thereof and into the groove of the shaft to engage a wall of said groove,
   d. anti-friction bearings mounting said roller element in the collar, and
   e. a pair of needle-bearing assemblages carried by opposite end portions of the collar, said assemblages constituting centralizers to center the shaft in the collar and including needle-bearing elements engaged with and adapted to roll around the periphery of the shaft.

2. A drive mechanism as in claim 1, and further including:
   a. an additional roller element carried by the collar in axial alignment with the first-mentioned roller element and extending inwardly of the bore of the collar,
   b. said shaft having an additional endless groove in its surface, spaced from the first-mentioned groove and disposed in axially-aligned relation thereto, said additional groove formed with a configuration identical to that of the first-mentioned groove,
   c. said additional roller element extending into said additional groove and engaging a wall thereof, and
   d. anti-friction bearings mounting said additional roller element in the collar,
   e. the spacing between corresponding portions of said grooves measured lengthwise of the shaft being uniform and equal to the spacing between the said roller elements.

3. A drive mechanism as in claim 2, wherein the opposite walls of the grooves are divergent, and the portions of the roller elements which are engaged in the grooves are conical.

4. A drive mechanism as in claim 3, and further including:
   9. means biasing the roller elements inwardly toward the axis of the shaft.

5. A drive mechanism as in claim 1, wherein:
   a. the groove in the shaft extends lengthwise thereof for a distance greater than the length of the collar measured from end to end.

6. A drive mechanism as in claim 1, wherein:
   a. the roller element is disposed midway between the needle-bearing assemblages.

7. A drive mechanism as in claim 1, and further including:
   a. means biasing the roller element inwardly toward the axis of the shaft.

* * * * *